United States Patent [19]
Hill

[11] Patent Number: 5,711,836
[45] Date of Patent: Jan. 27, 1998

[54] METHOD OF MARKING AN OBJECT

[75] Inventor: Gerald Christopher Paul Hill, Swinden, England

[73] Assignee: Raychem Limited, Swindon, United Kingdom

[21] Appl. No.: 583,048

[22] PCT Filed: Jun. 20, 1994

[86] PCT No.: PCT/GB94/01322

§ 371 Date: Dec. 13, 1995

§ 102(e) Date: Dec. 13, 1995

[87] PCT Pub. No.: WO95/00940

PCT Pub. Date: Jan. 5, 1995

[30] Foreign Application Priority Data

Jun. 12, 1993 [GB] United Kingdom ............. 9312751

[51] Int. Cl.⁶ ........................................... B32B 31/26
[52] U.S. Cl. ............... 156/215; 156/310; 156/DIG. 36; 428/347; 40/630
[58] Field of Search ................... 156/215, 310, 156/DIG. 6, DIG. 11, DIG. 13, DIG. 36; 40/630; 428/200, 347

[56] References Cited

U.S. PATENT DOCUMENTS

| | | | |
|---|---|---|---|
| 2,873,564 | 2/1959 | Bogeskov | 156/DIG. 6 |
| 2,975,091 | 3/1961 | Tobey | 40/630 |
| 3,819,434 | 6/1974 | Dembiak et al. | 156/310 |
| 4,465,717 | 8/1984 | Crofts et al. | 428/40 |
| 4,643,786 | 2/1987 | Cecchi | 156/DIG. 6 |
| 4,906,695 | 3/1990 | Blizzard et al. | 156/310 |
| 5,273,798 | 12/1993 | Miner | 40/630 |
| 5,593,759 | 1/1997 | Vargas et al. | 428/200 |

FOREIGN PATENT DOCUMENTS

| | | |
|---|---|---|
| 0027026 | 4/1981 | European Pat. Off. . |
| 0223044 | 5/1987 | European Pat. Off. . |
| 0237258 | 9/1987 | European Pat. Off. . |

*Primary Examiner*—Michele K. Yoder
*Attorney, Agent, or Firm*—Sheri M. Novack; Herbert G. Burkard

[57] ABSTRACT

A method of making an object wherein known sheets having a curable prim receiving coating (epoxy and polyamide particles) on one surface and pressure-sensitive adhesive on the other surface (normally used for attaching the printed and cured sheet to a wall or other surface) are wrapped around the object to be marked and the overlapping ends of the sheet are temporarily secured by an overlap bond between the pressure-sensitive adhesive and the curable coating. Subsequent curing of the coating fixes the indicia printed thereon and cures the bond to fix the sheet in position. Preferably, the pressure-sensitive adhesive (e.g. acrylic polymer will interact with the curable coating on curing.

14 Claims, 1 Drawing Sheet

METHOD OF MARKING AN OBJECT

SUMMARY OF THE INVENTION

This invention provides a method of marking an object, comprising providing a flexible support sheet having, or capable of having, fixable indicia applied to an indicia-receiving coating of curable material carried on one of its main surfaces and having a pressure sensitive adhesive (preferably acrylic) coating provided on part of the sheet, wrapping the sheet around the object to be marked so as to bring the pressure-sensitive adhesive into adherent contact with part of the indicia-receiving coating and with another part of the sheet, thus securing the sheet around the object, applying the said indicia, if not already present, to the indicia-receiving coating, and subsequently treating to fix the indicia and to cure the indicia-receiving coating, thereby bonding the sheet to itself in the area of adherent contact.

Preferably the sheet is wrapped so as to bring the indicia-receiving coating into overlap contact with the opposite main surface of the sheet. The indicia may be applied to the sheet by any appropriate method of printing, marking, laminating, transferring or other means.

Preferably the indicia-receiving coating is initially porous, preferably being of particulate and/or filamentary curable material.

The pressure-sensitive adhesive is provided on top of the indicia receiving coating or on the other part of the sheet which is brought into contact therewith, and preferably the pressure-sensitive adhesive is capable of reacting with the curing indicia-receiving coating material. When preferred materials are selected, the curing produces a bond of at least 25% (preferably at least 35%, more preferably at least 45% or at least 50%) greater strength (FINAT Test Method No. 1) than the pressure-sensitive adhesive bond prior to the curing. This may particularly be found when an indicia-receiving coating comprising epoxy material interacts with an acrylic polymer pressure-sensitive adhesive. It may be especially useful if the pressure-sensitive adhesive coating is on the main sheet surface remote from the indicia and also serves to adhere the sheet to the object.

The curable material preferably cures on heating by reaction of a plurality of reactive components which exist separately from one another in the form of filaments and/or parades. Preferably a component of the curable material comprises an epoxy material, and preferably another component of the curable material comprises a material having free amine groups. Alternatively, the curable material may be curable by irradiation, e.g. with U.V. light.

The indicia may be "fixable" in the sense that suitable treatment, by heating or U.V. irradiation for example, develops their final colour or causes them to adhere more strongly to the sheet. However, the indicia are preferably "fixable" by virtue of curing of the aforementioned indicia-receiving coating to which they are preferably applied.

In all cases, it is advantageous for the indicia to be fixable by the same treatment as is used to cure the indicia-receiving coating, preferably in a single operation.

The indicia may be applied, or added to, by any suitable methods, for example ink Jet printing after wrapping of the sheet around the object, but it will often be more convenient to apply all of the desired indicia before the wrapping step.

Any flexible sheet, e.g. a polymer film or laminate of polyester or polyamide, may be used which is capable of receiving and retaining the coating(s) and indicia, and any suitable curable materials and indicia-forming materials may be used, for example heat-curable epoxy systems or U.V. curable acrylics.

Preferred forms of marker for use in the method of this invention are described in EP-A-0237258 (RK297COM), the sheet and coating materials naturally being selected from those described to provide sufficient flexibility for wrapping around the object to be marked. The curable material (at least in the bonding area) is cured after wrapping of the marker around the object, as distinct from the prior curing of the markable surface to make the indelible labels described in EP-A-0237258. The ingenious use of the pressure-sensitive adhesive coating, which may be present on the reverse side of the known labels, to hold the bond contact prior to curing (the pressure-sensitive adhesive preferably reacting with the bond coating on curing), according to the present invention, is an especially advantageous feature of the present invention.

Examples of the present invention illustrating different possible arrangements of the components will now be described with reference to the accompanying schematic drawings, showing various forms of marker wrapped around an object (1) such as a pipe, shaft or cable.

DETAILED DESCRIPTION OF THE PREFERRED EMBODIMENTS

Figure 1:
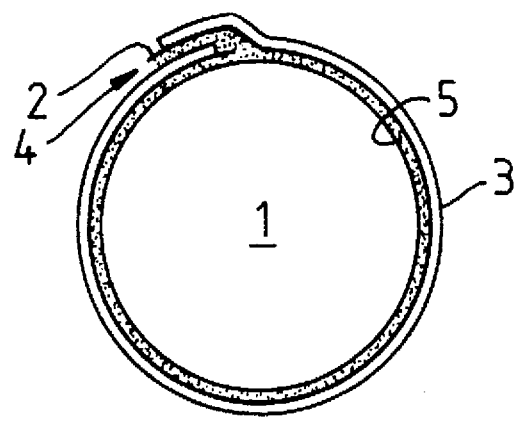
FIG. 1 shows an article constructed in accordance with the present invention.

In the preferred structure of FIG. 1, a 50 micrometre thick flexible polyester sheet (2) ("Mylar" Trade Mark) carries on its outer surface a particulate porous curable coating (3) on which indicia (not shown) have been printed as described in EP-A-0237258. An end portion of the coating (3) serves as the bond coating in the area of overlap (4). On the opposite, inner surface of sheet (2) is a coating (5) of pressure-sensitive acrylic adhesive [known per se] which serves both to secure the overlap bond at the ends of the sheet prior to curing and to adhere the sheet to the object (1).

After wrapping the sheet, before and/or after applying indicia to the curable coating (3), and establishing the temporary adhesive overlap bond by means of the pressure-sensitive adhesive (5), the assembly is heated to fuse and cure the coating (3). Thus curing fixes the indicia and increases time strength of the overlap bond by reaction of the acrylic adhesive with the curable (epoxy/polyamide) coating (3) in the overlap area (4).

Figure 2:
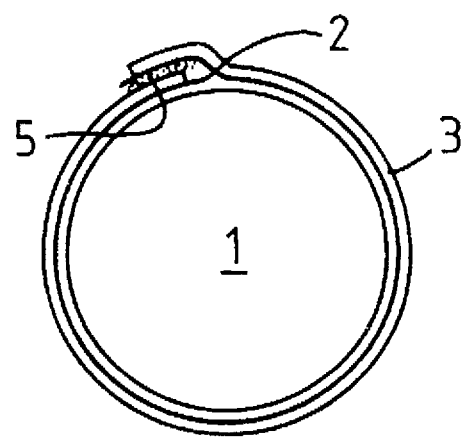
FIG. 2 shows an alternate embodiment of an article constructed in accordance with the present invention.

FIG. 2 shows a structure similar to that of FIG. 1, except that the pressure-sensitive adhesive (PSA) (5) is present on the inner surface of the sheet (1) only in the overlap area (4).

Of course, if transparent or translucent sheets were used, the indicia could be on the inner surface for viewing through the sheet, and this would even be possible with the relatively opaque indicia-receiving coating provided that the indicia were applied in such a way that they penetrated to the interface between the sheet and the coating.

I claim:

1. A method of marking an object, comprising:

providing a flexible support sheet having, or capable of having, fixable indicia applied to an indicia-receiving coating of curable material carried on one of its main surfaces and having a pressure sensitive adhesive coating provided on part of the sheet, wrapping the sheet around the object to be marked so as to bring the pressure-sensitive adhesive into adherent contact with part of the indicia-receiving coating with another part of the sheet, thus securing the sheet around the object, applying the said indicia, if not already present, to the indicia-receiving coating, subsequently treating to fix the indicia and to cure the indicia-receiving coating, thereby bonding the sheet to itself in the area of adherent contact;

wherein the pressure-sensitive adhesive is capable of reacting with the curing indicia-receiving coating material, and the curing of the indicia-receiving coating produces a bond of at least 25% greater strength than the pressure-sensitive adhesive bond prior to the curing.

2. A method according to claim 1, wherein the indicia-receiving coating is initially porous.

3. A method according to claim 2, wherein the indicia-receiving coating is of at least one of particulate and filamentary curable material.

4. A method according to claim 1, wherein the pressure-sensitive adhesive is provided on top of part of the indicia-receiving coating or on the other part of the sheet which is brought into contact therewith.

5. A method according to claim 1 wherein the curing of the indicia-receiving coating produces a bond of at least 35% greater strength than the pressure-sensitive adhesive bond prior to the curing.

6. A method according to claim 1 wherein the curing of the indicia-receiving coating produces a bond of at least 45% greater strength than the pressure-sensitive adhesive bond prior to the curing.

7. A method according to claim 1, wherein the curing of the indicia-receiving coating produces a bond of at least 50% greater strength than the pressure-sensitive adhesive bond prior to the curing.

8. A method according to claim 1, wherein the curable material cures by reaction of a plurality of reactive components which exist separately from one another in the form of filaments and/or particles.

9. A method according to claim 1, wherein a component of the curable material comprises an epoxy material.

10. A method according to claim 1, wherein a component of the curable material comprises a material having free amine groups.

11. A method according to claim 1, wherein the pressure-sensitive adhesive coating is on the main sheet surface remote from the indicia-receiving coating and also serves to adhere the sheet to the object.

12. A method according to claim 1, wherein the fixing of the indicia is effected by the same treatment as the curing of the indicia-receiving coating.

13. A method according to claim 12, wherein the fixing of the indicia is effected in a single operation.

14. A method according to claim 1 wherein the pressure sensitive adhesive coating is acrylic.

* * * * *